Oct. 27, 1970  G. ILLING  3,536,680
METHOD FOR PRODUCING POLYMERIZATES COMPRISING THE
ESSENTIAL STEPS OF KNEADING THE REACTION MIXTURE
AND SHEARING THE POLYMERS FORMED
Filed Oct. 23, 1964  2 Sheets-Sheet 2
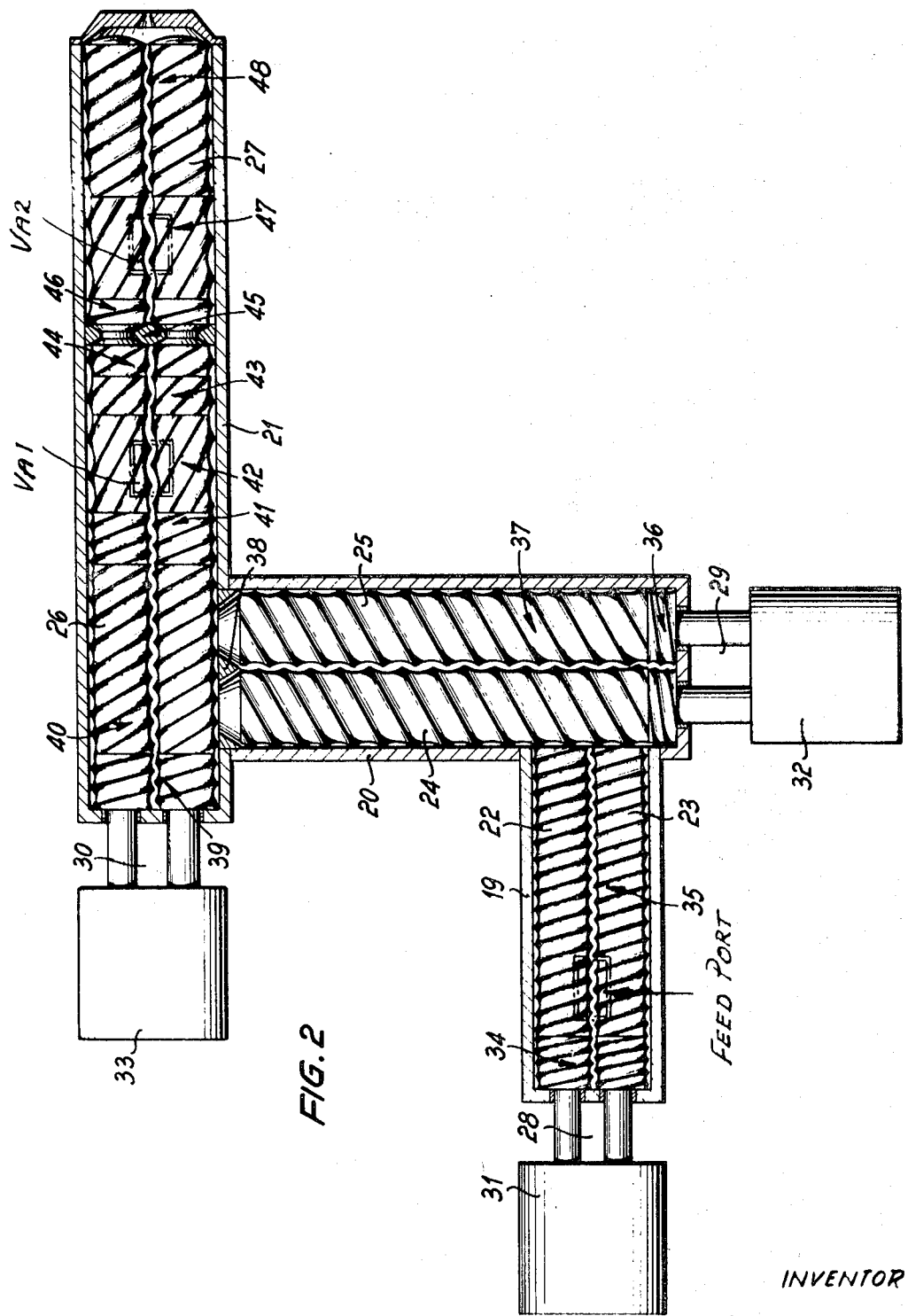
INVENTOR
GERHARD ILLING
BY Attorneys United States Patent Office 3,536,680
Patented Oct. 27, 1970

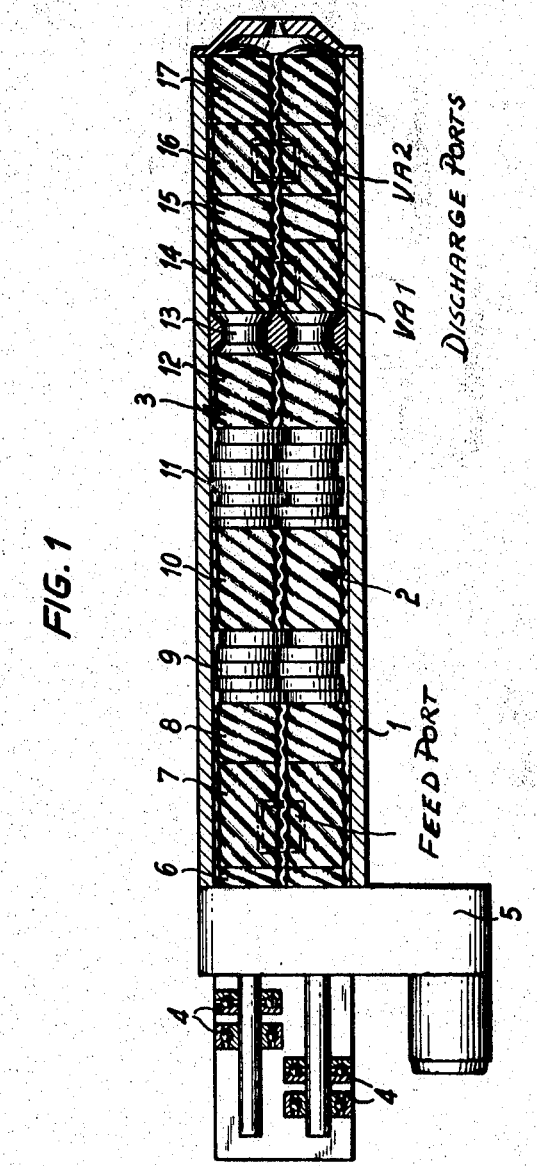

3,536,680
METHOD FOR PRODUCING POLYMERIZATES COMPRISING THE ESSENTIAL STEPS OF KNEADING THE REACTION MIXTURE AND SHEARING THE POLYMERS FORMED
Gerhard Illing, Grossumstadt, Germany, assignor to Werner & Pfleiderer, Stuttgart-Feuerbach, Germany, a firm of Germany
Filed Oct. 23, 1964, Ser. No. 406,128
Int. Cl. C08f 15/04
U.S. Cl. 260—85.5          5 Claims

ABSTRACT OF THE DISCLOSURE

There is disclosed a method of continuously producing homo- and co-polymerizates from ethylenically unsaturated monomers. The method is carried out by subjecting the monomeric material, in liquid form and in admixture with a polymerization catalyst, to a pressure of 10 to 1000 atmospheres above atmospheric pressure and at a temperature of about 100° to 300° C. The method of the invention produces high space-time yields of polymerizates with the desired medium molecular weights.

This invention relates to a method of, and a device for, preparing polymerizates from polymerizable ethylenically unsaturated compounds which are in a liquid or solid state at room temperature.

It is known to prepare polystyrenes or copolymers into which styrene is polymerized by polymerizing styrene alone, or in a mixture with other ethylenically unsaturated compounds at temperatures up to about 170° C. and at pressures between 700 and 2500 atmospheres above atmospheric, and if desirable, in the presence of initiators forming conventional radicals. This method is technically complex and expensive, due to the required high pressures. Furthermore, it is difficult to avoid yellowing of the polymerizates, since they are heated for a comparatively long time at high temperatures and are adversely affected thereby.

It is also known discontinuously to polymerize styrene alone or in a mixture with vinyl halogenides in the presence of a mixture of 4,4'-dihydroxy-benzoyl peroxide and adipoyl peroxide or dioxane-peroxides at temperatures of 100° to 400° C. and pressures between 100 and 500 atmospheres. This method produces polymerizates with only low space-time yields. The phrase "space-time yield" refers to the quotient of liter reaction product:liter reaction space per hour.

It is further known to produce polymerizates from styrene and acrylonitrile by polymerization in solution by polymerizing part of the dissolved monomers, and removing the solvent and the residual monomers in two stages. This method is technically complex and economically expensive, since only part of the monomers is polymerized; and the monomers separated from the polymerizate and the solvent must be reconditioned before being reused. The space-time yield is also small.

Another known method is to dissolve polystyrene in styrene and discontinuously to produce shaped bodies in pressure-resistant molds from this solution in the presence of redox. systems or metal redox. systems.

It is also known discontinuously to produce shaped bodies in pressure-resistant molds from granular or plastic mixtures of polymers and liquid monomers based on vinyl, vinylidene and acrylic structures, whereby redox. systems or metal redox. systems are added as polymerization initiators. This method is technically very complex.

Another known method is discontinuously to polymerize a mixture of styrene and up to 5% by weight of acrylonitrile or methacrylonitrile, and optionally, in the presence of polymerization initiators, such as benzoyl peroxide. Polymerizates produced in this manner are frequently strongly yellowed.

Finally, it is known to polymerize a mixture of styrene and acrylonitrile at temperatures of 120° to 180° C. and at pressures of 3 to 5 atmospheres above atmospheric in the presence of plasticizing agents, such as phenyldichlorobenzene. It is impossible by this method to produce shaped bodies that are free of softness.

It has been found that the abovementioned disadvantages of the methods heretofore known can be avoided, and that polymerizates can be continuously produced at elevated temperatures and at elevated pressures from polymerizable ethylenically unsaturated compounds which are liquid or solid at room temperatures, preferably, by polymerization of the monomers, and desirably, in the presence of radical-forming agents, by polymerizing the polymerizable compounds in a reaction tube through which the compounds are force-fed while pressures of 10 to 1000 atmospheres above atmospheric are maintained, while subjecting the molten polymerizate to the action of shearing forces, and if necessary, removing volatile components from the polymerizate.

The method of the invention produces high space-time yields of polymerizates with the desired medium molecular weights.

Particularly suitable ethylenically unsaturated compounds which can be polymerized with each other and which are in liquid or solid state at room temperature (referred to hereinafter as monomers) are, for instance, styrene, α-methylstyrene, p-chlorostyrene, 2,5-dichlorostyrene, acrylonitrile, acrylic acid and methacrylic acid, the methyl ester, ethyl ester or butyl ester of these acids, acrylic acid amide, methacrylic acid amide, N-butyl-acrylic acid amide, N-dibutyl acrylic acid amide, N-isopropyl-α-methyl acrylic acid amide, and amides of other unsaturated carboxylic acids, such as crotonic acid amide, β-phenyl crotonic acid amide, which also may be N-mono substituted, or N-di substituted, fumaric acid dinitrile, fumaric acid diamide, maleic acid dinitrile, or maleic acid anhydride.

The mentioned monomers can be polymerized alone or in mixtures with others. It is feasible to polymerize styrenes which require a comparatively long polymerization time in admixture with the other mentioned more rapidly polymerizing monomers.

Suitable polymerization initiators which form radicals are, for instance, organic peroxides, such as di-tertiary-butyl peroxide, cumene hydroperoxide, dibenzoyl peroxide, tertiary-butyl hydroperoxide, lauroyl peroxide, butanone peroxide, cyclohexanone peroxide, succinyl peroxide; further, azo compounds such as azo-bis-isobutyronitrile, or N-chlorophthalamide. Also suitable are conventional redox. systems and metal redox. systems, such as potassium persulfate/formaldehyde sulfoxylate, potassium persulfate/sodium bisulfite, iron-II-salts, hydrogen peroxide/iron-II-sulfate or ammonium perchlorate/dimethyl amino-propionitrile. Also suitable are the so-called "complex" catalysts, such as aluminum halogeno-alkyls or chlorides of titanium or vanadium or chromium.

Additives such as pigments, dyes, stabilizers or mold lubricants which do not affect the polymerization, may be added alone or in mixtures to the polymerization charge. The additives may be admixed during or after the polymerization.

According to the invention the continuous polymerization of the monomers is effected in a reaction tube which is equipped with force-feeding or conveyor means and may be angular. The polymerization charge consisting of monomers, and if desirable, also polymerization initiators and the aforementioned additives, is first intimately mixed at room temperature and then is compressed in the reaction tube at pressures of 10 to 1000 atmospheres above atmospheric and is polymerized at temperatures of 100° to 300° C. The molten polymerizate is thereupon subjected to the action of shearing forces, whereby the initially formed high molecular weight is reduced until the desired medium molecular weight of the polymerizate is reached. Any volatile components which may still be present in the polymerizate may now be removed therefrom at reduced pressure. The finished polymerizate may be shaped in a known manner, for instance, by means of injection or extrusion apparatus. Such apparatus may be connected to the discharge end of the reaction tube.

An advantageous embodiment of the invention will now be described.

With a reaction tube with a force-feeder and including zones which can be heated and cooled, an extruder is used the force-feeding means of which comprises two worm shafts rotating in the same direction and in self-cleaning engagement. The worm shafts comprise segments or sections of different pitch so that the melts remain within the zones which are formed by the segments for different periods of time.

The polymerization mixture, to the extent that it is solid, is heated in a melting-down zone until it is liquefied, whereby the temperature is preferably so selected that the polymerization mixture which is continuously fed into the extrusion device is melted within a short time, to wit, within about 5 to 50 seconds, preferably within 20 to 30 seconds. The melting-down zone may be omitted when polymerization mixtures are used which are in a liquid state at room temperature. The liquefied or liquid polymerization mixture is polymerized within about 30 seconds to 30 minutes within a so-called "polymerization zone" following the melting-down zone. The polymerization mixture is in the form of a thin layer in the polymerization zone and is vigorously kneaded, whereby the temperature at the end of this zone rises to about 100° to 300° C. due to the heat of polymerization or the kneading heat. The polymerizate is then forced into the so-called "shearing zone," which comprises a narrow adjustable slit of 0.5 to 13 mm. between the rotary worm shafts and a surrounding jacket. The width of the slit, which can be adjusted between 2 and 6 cm. by pushing or withdrawing adjustable jaws movably mounted in the wall of the extrusion device, is so selected that the polymerizates, due to the action of the shearing forces, after leaving the shearing zone, have melt indices between 0.1 and 50, preferably between 0.5 and 35 (measured at 10° to 20° C. above the melting point of the polymers) and K values (measured according to Fikentscher, "Cellulosechemie," 13, 1932, page 58) of from 30 to 100. The melt indices and the K values, respectively, are adusted in accordance with the specific use for which the polymerizates are intended. The temperature of the molten polymerizate, which may rise briefly to 400° C. due to the addition of energy in the shearing zone, is now lowered to 300° to 100° C. in the so-called "degassing zone," if the polymerizate contains volatile components, such as monomers or oligomers. In the degassing zone, which preferably has two stages, the molten polymerizate is practically completely stripped of volatile components. Preferably, the degassing is carried out under reduced pressure of approximately between 1 and 100 mm. Hg, although it is advantageous to work with melts of high viscosity, at temperatures in the range of 200° to 300° C., to accelerate the liberation of the volatile components. The monomeric or oligomeric components which are removed during the degassing under vacuum can be returned, immediately or after distillation, into the reaction process.

The polymerizate melt can now be shaped in a conventional manner by means of a molding device connected to the extruder. Such a molding device may, for instance, be constituted of cooled nozzles or nozzle plates.

If it is desired to dye the polymerizates only after completion of the polymerization, it is advantageous to connect an extruder to the reaction tube. The polymerizate and the additives can then be mixed in the extruder and subsequently molded in the usual manner. Instead of an extruder, an injection molding device may be used.

The method of the present invention has several advantages over comparable methods heretofore known. The known methods permit the polymerization of monomers only either with complex technical equipment or with low space-time yields, whereas the method of the invention permits of the continuous polymerization of monomers with a high space-time yield. Another advantage is that polymerizations according to the invention can be carried out without solvents and/or plasticizers.

The monomers remain only for a short time within the polymerization tube, which is technically advantageous, since it results in very light-colored polymerizates which are not thermally affected. It is also advantageous in that polymerizates with a predetermined medium molecular weight can be readily produced. It is also possible with the method of the invention to start and to terminate a continuous polymerization within a few minutes.

The invention also provides for a novel and improved apparatus for carrying out the method of the invention. This device comprises a reaction tube including a plurality of zones which can be heated and cooled. The tube is equipped with means for feeding the polymerization charge at an inlet end of the tube and with means for varying the rate of travel of the charge and also the cross section of the tube in the central portion thereof. The tube may also be equipped with means for feeding additives to the polymerizate melt and with means for evaporating the volatile components, such as monomers and oligomers in the last part of the reaction tube. The tube is equipped with means for force-feeding of the charge and with bearings on the outside of the tube for a one-sided support of the forcible feeding means. Finally, the tube comprises variable speed means for gradual or stepless control of the forcible feed means.

The heatable and coolable reaction tube is preferably made of refined or suitably alloyed steel, and is constructed so that it is capable of sustaining pressures up to 1000 atmospheres above atmospheric and temperatures up to 400° C., especially in the shearing zone. It may consist of one piece, but it may also be formed of several pieces, which may have different diameters and may be joined, for instance, by flanges coaxial or at an angle in reference to each other, preferably at an angle of 90°. The total length of the reaction tube depends upon the desired polymerization velocity and the desired properties of the polymerizate. Suitable reaction tubes may have, for instance, an inner diameter of 100 to 300 mm. and a length of 1 to 4 m. Feeding of the polymerization charge at the inlet end of the reaction tube may be effected by conventional feed screws, dosing band scales or vibrating conveyor belts.

To effect variations in the cross section of the tube in the central part thereof, gradually adjustable setting jaws or similar members may be provided so that an adjustable slit or gap between the rotary worm shafts and the adjustable jaws is formed. Suitable adjustment jaws are produced, for instance, under Code ZSK 53/1600 by Werner & Pfleiderer of Stuttgart, Germany, and are readily available. The adjustable gradients of the velocity (G=rotation velocity/gap width are between 1000 and 10,000 per second$^{-1}$. Suitable equipment and the operation thereof are described in "Processing of Thermoplastic Materials," Bernhardt, Reinhold Publishing Corp., New York, 1959, pages 9, 65, and 255–258. A forcible feeding means particularly suitable for a coaxial reaction tube is a combination of two worm gears with exchangeable segments which clean each other. The segments should be arranged so that they permit a compression factor of 1:2 to 1:5 in the melting zone by a reduction of the pitch. The force-feeding means is further equipped in the polymerization zone with stacks of eccentric disks so that the exposed surface of the polymerizing mixture becomes very large, while the volume is kept small. Such a structure has the advantage of an extensive kneading action obtainable by a comparatively small force-feeding power input. In the shearing zone, conical disks into which the jaws extend from the jacket of the tube are provided. The degassing zones preferably include worm segments with a high pitch, whereby the polymerizate melt is strongly expanded. Between the degassing zones a worm segment with a low pitch is preferably provided to effect compression of the polymerizate melt. The worm shaft of the discharge zone preferably includes a steeply cut segment with a very low pitch so that a sufficiently high discharge pressure is built up.

In the event that a polymerization tube of angular shape is used—for instance, a tube formed by three tube sections meeting at 90° angles, a force-feeding device is preferably provided for each tube section, and the drive of the force-feeding device is preferably effected by a separate power drive.

In some cases the force-feeding device may comprise a single worm shaft, but several worm shafts, such as three or four, are preferable when a high release of reaction heat is to be expected. The r.p.m. of the worm shaft or shafts are preferably variable between 10 and 300. Suitable worm shafts may have cylindrical cores upon which are seated, secured against rotation, segments such as worm bushings, eccentric disks or conical disks with different diameters and pitches. The segments may also consist of spindle profiles joined to each other by bayonet locks.

The bearings preferably are pressure bearings of the type which are conventionally used for extruders.

The force-feeding device may be driven at a gradually variable speed by suitable electric motors.

The power drive for a load up to 10kw. is preferably effected by a variable speed electric motor. If the load is up to 50 kw., a three phase electric motor in conjunction with a variable speed gear preferably is provided, and if the required power load is still higher, a DC motor in conjunction with a Ward-Leonard regulator set may be advantageously used.

To effect heating of the reaction tube, conventional devices for such purpose may be used, such as resistance heaters, inductance heaters, heated liquids or heated gasses. Cooling may be effected by cooling liquids, gas cooling or air containing water vapor.

In the accompanying drawing two preferred embodiments of the invention are shown by way of illustration, and not by way of limitation.

In the drawing:

FIG. 1 shows diagrammatically a lengthwise section of a straight reaction tube according to the invention, and FIG. 2 is a sectional view of a reaction tube composed of several sections meeting at 90° angles.

The reaction tube according to FIG. 1 is suitable for polymerizing mixtures of monomers which contain solid components at room temperature and the polymerizates of which have low viscosities.

The figure shows a reaction tube 1 including a plurality of zones which can be heated or cooled and is of equal inner diameter along its entire length. The tube houses two worm shafts 2 and 3 which serve as forcible feeding means. The shafts are supported at one end by means of bearings 4 located outside the reaction tube. Rotation of the shafts in the same direction is effected by a motor 5. The motor is of a type the r.p.m. of which may be gradually varied.

Shafts 2 and 3 are formed of segments 6 to 17, the pitches of which are different from each other. As a result, the polymerization mixture can be continuously conveyed through the reaction tube 1 at different velocities in different zones of the tube.

According to FIG. 1, the segments comprise worm bushings, conical disks, and kneading blocks including eccentric disks.

On the basis of the operational stages which occur within the aligned segments when and while the method of the invention is carried out, different zones may be distinguished. Segment 6 prevents intrusion of the reaction mixture into the motor drive 5. Segment 7 constitutes the charging zone and serves to feed the polymerization mixture into the melting zone, in which segments 7 and 8 effect liquefying and compressing of the polymerization mixture. Segments 7 and 8 comprise worm bushings with low pitches to effect such liquefying and compression. The entry of the reaction mixture is indicated in segment 7 by the legend FEED PORT.

The polymerization zone is formed by segments 9 through 12. Segment 9 comprises eccentric disks for distributing the polymerizing melt in the form of a thin layer or film. Segment 10 merely effects conveyance of the polymerizing reaction mixture into a kneading block formed in segment 11 by eccentric disks. Segment 12, which constitutes the end of the polymerization zone, has low pitches to build up the pressure of the viscous melt.

The melt is now conveyed to segment 13, which constitutes a shearing zone. This segment is formed of conical disks seated on cylindrical shaft portions and gradually or steplessly adjustable jaws or other suitable members so that an adjustable gap or slit is formed between the rotary worm shafts and the jaws. In the shearing zone thus formed the polymerizate is exposed to shearing forces depending upon the viscosity of the melt, the rate of rotation of the worm shafts and the width of the gap. The afore-indicated magnitudes are so correlated that the desired viscosity of the molten polymerizate is obtained.

The degassing zone is formed by segments 14, 15 and 16 and serves to remove the volatile components in the polymerizate. The degassing zone comprises two discharge ports, VA1 and VA2, in which the worm bushings have a high pitch. A worm bushing with a low pitch is disposed between the two high pitch bushings. Segments 14 and 16 are closed gas-tight against segment 15, in which the mixture is compressed. Segment 16 is followed by segment 17, which constitutes the discharge zone. Segment 17 includes bushings which have a very low pitch but have steeply cut flanks defining the turns of the worm segment. The discharge zone may be connected to suitable conventional molding means, such as nozzle heads with profile-forming bores, to effect the shaping of threads, tubes, rods, ribbons, etc. The finished polymerizate melt may also be fed to a die-casting or ejection molding machine.

Turning now to FIG. 2, this figure shows a device which is particularly suitable for polymerizing monomers which are liquid at room temperature. The reaction tube comprises three tube sections 19, 20 and 21, which are fixedly secured to each other at right angles and have inner diameters different from each other. The tube sections include zones which may be heated or cooled. Tube section 19 includes forcible-feed means in the form of two worm shafts 22 and 23 supported at one end by bearings 28 disposed outside the tube section. Tube section 20 includes forcible-feed means formed by sectionalized worm shafts 24 and 25 one-sidedly supported by bearings 29, and tube section 21 similarly includes forcible-feed means in the form of sectionalized worm shafts 26 and 27 one-sidedly supported by bearings 30. The worm shafts in each tube section are rotated in the same direction by motor drives 31, 32 and 33, respectively, the rotational speed of which can be gradually varied. Worm shafts 22 and 23 in tube section 19 comprise segments 34 and 35. Segment 34 serves to prevent penetration of the reaction mixture into bearings 28 and motor drive 31. Segment 35 comprises two worm bushings with low pitch and serves to force-feed the reaction mixture into tube section 20, the inner diameter of which is preferably 60 to 200 mm. larger than that of tube section 19. Worm shafts 24 and 25 in tube section 20 consist of segments 36 and 37. Segment 16 constitutes a seal for bearings 29 and power drive 32, and segment 37 is formed of worm bushings of practically uniform pitch to distribute the polymerizing starting mixture in the form of a thin layer or film.

At the end of the forcible-feed means in tube section 20 a shearing zone 38 is provided. This zone is formed by a conical gap defined by the conical ends of worm shafts 24 and 25 and an adjacent wall portion of tube section 21.

The worm shafts in tube section 21 are composed of a plurality of lengthwise aligned segments. Tube section 21 is sealed liquid-tight against bearings 30 and motor drive 33 by a segment 39 in the tube section. This section further includes segments 40 and 41 which are formed of worm bushings with low pitches to compress the molten polymerizate. A further segment 42 constitutes the discharge zone and comprises a worm bushing with a high pitch to effect relief of the melt. The liberated gas is discharged through the port indicated by the legend GAS DISCHARGE PORT. Segments 43 and 44 following segment 42 comprise worm bushings with low pitch to compress the polymerizate melt. The compressed melt is then conveyed to a segment 45 which constitutes a shearing zone. This segment is formed by conical disks seated upon cylindrical shaft portions and gradually adjustable jaws of conventional design which are so arranged that an adjustable gap or slit is formed between the rotary worm shafts and the jaws. The polymerizate is exposed to shearing forces in the shearing zone. The shearing forces depend upon the viscosity, the r.p.m. of the worm shafts, and the width of the gap, and are so correlated that the desired molten viscosity of the polymerizate is obtained.

The next following segment 46 comprises a worm bushing to convey the polymerizate melt into a second degassing zone. This zone is formed by a segment 47 which consists of a worm bushing with a high pitch to relieve the melt. The liberated gas is discharged through a port designated GAS DISCHARGE PORT. Segment 47 is followed by a segment 48 comprising a worm bushing with a low pitch to press the polymerizate through a nozzle plate by means of which the polymerizate can be shaped into strands or other bodies in a conventional manner.

Several examples are given hereinafter. The parts referred to in the examples are parts by weight. The specification further includes Tables 1 through 5. To the extent that the abbreviations used in the tables are not explained therein, they have the significant defined in Example 1.

EXAMPLE 1

As is stated in Table 1 (items [a] through [o]), A parts of styrene containing C parts of azodi-isobutyric acid nitrile in solution and B parts of acrylonitrile, cooled down to 4° to 6° C., are fed into segment 35 (FIG. 2). Rotary worm shafts 22 and 23, which rotate at $n_1=120$ r.p.m., force-feed the reaction mixture into tube section 20 within 20 to 40 seconds. The tube sections 19 and 20 are so heated that the temperature of the reaction mixture when entering tube section 20 is about 130° to 180° C. The polymerization mixture is conveyed while at a pressure up to 150 atmospheres above atmospheric through the rotary worm shafts 24 and 25 rotating at $n_2=2$ r.p.m. The mixture while being so conveyed is in the form of a very thin foil-like layer and is being kneaded. After remaining in tube section 20 for a period of time $t_1$, whereby the mixture obtains a maximal temperature of $T_1$, the polymerizate is pressed through the gap formed between the conical ends of shafts 24 and 25 of the wall of tube section 21 and having a width of $b_1$ into tube section 21.

Tube section 21 has a temperature within the range of 210° to 265° C. The polymerizate melt is conveyed by the mutually cleaning worm shafts 26 and 27, which rotate at $n_3=n_2+20$ r.p.m., into the first degassing zone (segment 42) while under a pressure of 50 atmospheres above atmospheric. In this degassing zone the pressure drops to 40 to 100 mm. Hg, and the volatile components, consisting primarily of monomers, are removed at this reduced pressure and at a temperature between 200° and 270° C. After a dwell time of about 10 seconds in the degassing zone, the high-viscosity polymerizate melt, which has a temperature of $T_2$, is force-fed into the second shearing zone (segment 45). The gap in the zone has a width of $b_2$. As a result, the temperature of the melt increases to $T_3$ and the pressure to about 500 atmospheres above atmospheric. The polymerizate melt is subsequently freed, in the second degassing zone (segment 47), from residual volatile components which may still be present by producing in the tube part occupied by segment 47 a reduced pressure of 1 to 10 mm. Hg and by heating this tube part to about 200° to 270° C. Subsequently the melt is pressed out in the form of strands or any other desired shapes through a nozzle plate which is connected to final segment 48. The strands are chilled and granulated in the usual manner. The characteristics of the obtained polymerizate (items [a] through [o], supra) are also listed in Table 1. The polymerizates are suitable for use in injection molding and strand-pressing machines.

EXAMPLE 2

As stated in Table 2 (items [a] through [o]), A parts of styrene and B parts of methacrylic acid methyl ester with C parts of benzoyl peroxide, as catalyst, are polymerized in the apparatus of FIG. 2 while maintaining the afore-described reaction conditions. Unless otherwise specified in Table 2 as to temperatures and pressures, the values given in Example 1 are to be used. The polymerizates thus obtained are suitable for the shaping of formed bodies by means of suitable molding and other forming devices.

EXAMPLE 3

Table 3 (items [a] through [k]) defines the conditions for preparing polymerizates from A parts of styrene and B parts of methacrylic acid methyl ester in the presence of 0.5 part of cumene hydroperoxide with the device according to FIG. 2. The polymerizate obtained has the described properties. Unless otherwise stated in Table 3 as to temperatures and pressures, the values given in Example 1 are to be used. The obtained polymerizates are suitable for the manufacture of transparent plates.

EXAMPLE 4

As stated in Table 4, A parts of styrene and B parts of acrylic acid amide ($F_p$ 84° to 85° C.) with 0.7 part of benzoyl peroxide are mixed and added at the port in segment 7 in tube 1 of FIG. 1, in which the two rotary shafts 2 and 3 rotate at $n_2=$r.p.m. The reaction mixture, while being intimately mixed and heated, is molten within 10 to 40 seconds in segments 7 and 8 and is heated to 150° to 180° C. while being compressed to about 200 atmospheres above atmospheric. The reaction mixture is polymerized in the time $t_1$ in segments 9 through 11, whereby the mixture is rolled out to a thin layer in segment 9, conveyed through segment 10 and plasticized in segment 11 in the time $t_1$. The polymerizate is pressed in segment 12 at a pressure of up to 350 atmopheres above atmospheric through the adjustable gap 13, which has a width of $b_1$, whereby the temperature $T_2$ is obtained. In segment 14 a subatmospheric pressure of 40 to 150 mm. Hg is obtained, and the polymerizate melt is removed within 3 to 10 seconds. Subsequently, the polymerizate is fed through segement 15, in which a pressure of about 10 to 30 atmospheres above atmospheric is built up. In the degassing zone 16 a subatmospheric pressure of 5 to 20 mm. Hg is produced, and the volatile components are removed from the polymerizate at the temperature $T_3$. Finally, the polymerizate melt is compressed in segment 17 to 30 to 50 atmospheres above atmospheric and pressed out through a nozle plate to produce a discharge of a desired configuration. The polymerizate thus obtained has the properties listed in Table 4 and may be used for forming shaped bodies.

EXAMPLE 5

A parts of styrene, B parts of acrylonitrile and C parts of methacrylic acid methyl ester are polymerized in the presence of 0.3 part of benzoyl peroxide, as described in Example 1, except for the changes listed in Table 5. The obtained polymerizate may be pressed out in shaped form. The characteristics of the polymerizates are also listed in Table 5. The products can be immediately shaped into bands, plates or profiled bodies and can subsequently be machined to produce chips.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

TABLE 1

| | Starting components Proportions | | | Reaction conditions | | | | | | | | Properties of the Reaction Product | | |
|---|---|---|---|---|---|---|---|---|---|---|---|---|---|---|
| | A, parts | B, parts | Catalyst C, parts | $t_1$, min. | $T_1$, °C. | $b_1$, mm. | $n_2$, r.p.m. | $T_2$, °C. | $b_2$, mm. | $T_3$, °C. | | Polymer Melting Point [1] $T_s$ °C. | K value [2] | Appearance |
| (a) | 90 | 10 | 0.5 | 18 | 205 | 5 | 80 | 210 | 4 | 240 | | 102 | 65 | h+t. |
| (b) | 80 | 20 | 0.5 | 13 | 212 | 6 | 90 | 220 | 5 | 240 | | 110 | 78 | h+t. |
| (c) | 70 | 30 | 0.5 | 9 | 220 | 6 | 120 | 230 | 6 | 245 | | 118 | 75 | lt+d. |
| (d) | 60 | 40 | 0.5 | 2 | 230 | 8 | 160 | 240 | 8 | 245 | | 124 | 76 | lt+d. |
| (e) | 50 | 50 | 0.5 | 1.6 | 235 | 8 | 240 | 240 | 10 | 250 | | 140 | 75 | o+d. |
| (f) | 40 | 60 | 0.5 | 2.0 | 235 | 10 | 200 | 240 | 12 | 240 | | 152 | 97 | o+d. |
| (g) | 30 | 70 | 0.5 | 1.5 | 240 | 10 | 250 | 245 | 12 | 250 | | 170 | 91 | o. |
| (h) | 20 | 80 | 0.5 | 1.4 | 240 | 12 | 250 | 245 | 12 | 250 | | 180 | 97 | o. |
| (i) | 10 | 90 | 0.5 | 1.3 | 245 | 12 | 250 | 245 | 12 | 270 | | 190 | 95 | o. |
| (j) | 50 | 50 | 1.0 | 1.4 | 240 | 10 | 250 | 250 | 12 | 260 | | 142 | 76 | o+d. |
| (k) | 50 | 50 | 0.2 | 2.5 | 230 | 10 | 180 | 240 | 8 | 245 | | 138 | 70 | o+d. |
| (l) | 40 | 60 | 0.5 | 2.0 | 235 | 8 | 250 | 245 | 4 | 280 | | 153 | 74 | o+d. |
| (m) | 30 | 70 | 0.5 | 1.5 | 240 | 8 | 250 | 250 | 5 | 285 | | 168 | 73 | o. |
| (n) | 20 | 80 | 0.5 | 1.4 | 245 | 6 | 250 | 260 | 4 | 285 | | 175 | 75 | o. |
| (o) | 10 | 90 | 0.5 | 1.3 | 245 | 6 | 300 | 265 | 6 | 290 | | 185 | 72 | o. |

[1] The polymer melting point is measured on the Kofler-Bank (Sorenson Campbell, Praparative Methoden der Polymeren-Chemie, Verlag Chemie 1962, pp. 50–52).
[2] The K value is measured according to Fikentscher, "Cellulosechemie" 13, p. 58 (1932) in dimethylformamide (DMF). (See also Sorenson Campbell, Praparative Methoden der Polymeren-Chemie, pp. 37–40.)

NOTE:
h=clear; t-transparent (vitreous); lt=slightly cloudy; d=translucent; o=opaque.

TABLE 2

| | Starting components | | | Reaction Conditions | | | | | | | | | Properties of the reaction product | | |
|---|---|---|---|---|---|---|---|---|---|---|---|---|---|---|---|
| | A, parts | B, parts | C, parts | Tube section 21 temperature, °C. | $t_1$, min. | $T_1$, °C. | $b_1$, mm. | $n_1$, r.p.m. | $n_2$, r.p.m. | $n_3$, r.p.m. | $T_2$, °C. | $b_2$, mm. | $T_3$, °C. | Polymer Melting Point [1], °C. | K value [2] | Appearance |
| (a) | 90 | 10 | 0.5 | 180–200 | 10 | 180 | 3 | 100 | 50 | 70 | 180 | 3 | 200 | 84 | 56 | t. |
| (b) | 80 | 20 | 0.5 | 180–200 | 18 | 185 | 3 | 100 | 60 | 80 | 185 | 3 | 210 | 98 | 56 | t. |
| (c) | 70 | 30 | 0.5 | 190–210 | 18 | 190 | 4 | 100 | 70 | 90 | 190 | 5 | 220 | 105 | 56 | lt. |
| (d) | 60 | 40 | 0.5 | 200–210 | 12 | 200 | 4 | 100 | 80 | 100 | 205 | 5 | 225 | 115 | 57 | lt. |
| (e) | 50 | 50 | 0.5 | 210–220 | 10 | 210 | 6 | 100 | 90 | 110 | 212 | 6 | 225 | 152 | 56 | d. |
| (f) | 40 | 60 | 0.5 | 220–230 | 7 | 220 | 7 | 100 | 120 | 140 | 225 | 6 | 240 | 158 | 55 | d. |
| (g) | 30 | 70 | 0.5 | 225.240 | 3 | 225 | 9 | 100 | 150 | 170 | 230 | 6 | 260 | 162 | 53 | d, o. |
| (h) | 20 | 80 | 0.5 | 240–250 | 2.5 | 230 | 10 | 100 | 160 | 180 | 240 | 6 | 270 | 144 | 55 | o. |
| (i) | 10 | 90 | 0.5 | 240–250 | 2.0 | 230 | 10 | 100 | 170 | 190 | 240 | 6 | 280 | 148 | 54 | o. |
| (j) | 10 | 90 | 0.7 | 240–250 | 2.0 | 235 | 10 | 100 | 180 | 200 | 240 | 10 | 255 | 152 | 60 | o. |

[1] The polymer melting point is measured on the Kofler-Bank (Sorenson Campbell, Praparative Methoden der Polymeren-Chemie, Verlag Chemie, 1962, pp. 50–52).
[2] The K value is measured according to Fikentscher, "Cellulosechemie" 13, p. 58 (1932) in dimethylformamide (DMF). (See also Sorensom Campbell, Praparative Methoden der Polymeren-Chemie, pp. 37–40.)

NOTE:
t=transparent (vitreous); lt=slightly cloudy; d=translucent; o=opaque.

TABLE 3

| | Starting components | | Reaction conditions | | | | | | | | | | Properties of the reaction product | | |
|---|---|---|---|---|---|---|---|---|---|---|---|---|---|---|---|
| | A, parts | B, parts | Tube section 21 temperature, °C. | $t_1$, min. | $T_1$, °C. | $b_1$, mm. | $n_1$, r.p.m. | $n_2$, r.p.m. | $n_3$, r.p.m. | $T_2$, °C. | $b_2$, mm. | $T_3$, °C. | Polymer Melting Point [1], °C. | K value [2] | Appearance |
| (a) | 100 | 0 | 180–200 | 20 | 180 | 4 | 100 | 30 | 50 | 180 | 4 | 180 | 150 | 43.5 | g. |
| (b) | 90 | 10 | 180–200 | 9 | 210 | 4 | 100 | 70 | 90 | 185 | 4 | 190 | 152 | 36.3 | g. |
| (c) | 80 | 20 | 190–210 | 7 | 215 | 4 | 100 | 90 | 110 | 190 | 4 | 200 | 155 | 31.1 | lt. |
| (d) | 70 | 30 | 200–210 | 6 | 220 | 4 | 100 | 100 | 120 | 200 | 4 | 205 | 160 | 38.9 | lt. |
| (e) | 60 | 40 | 210–220 | 5 | 220 | 4 | 100 | 130 | 130 | 205 | 4 | 210 | 173 | 36.9 | lt. |
| (f) | 50 | 50 | 210–220 | 4.5 | 225 | 4 | 100 | 120 | 140 | 210 | 4 | 220 | 184 | 41.7 | lt. |
| (g) | 40 | 60 | 220–230 | 4.0 | 230 | 4 | 100 | 130 | 150 | 220 | 4 | 225 | 187 | 38.9 | lt–d. |
| (h) | 30 | 70 | 220–230 | 4.0 | 230 | 4 | 100 | 130 | 150 | 220 | 4 | 230 | 190 | 43.5 | d. |
| (i) | 20 | 80 | 230–240 | 3.7 | 235 | 4 | 100 | 140 | 160 | 230 | 4 | 240 | 195 | 39.4 | d. |
| (j) | 10 | 90 | 240–250 | 3.0 | 235 | 4 | 100 | 150 | 170 | 240 | 4 | 250 | 195 | 41.3 | o. |
| (k) | 0 | 100 | 250–260 | 2.5 | 240 | 4 | 100 | 160 | 180 | 250 | 4 | 280 | 200 | 45.0 | o. |

[1] The polymer melting point is measured on the Kofler-Bank (Sorenson Campbell, Praparative Methoden der Polymeren-Chemie, Verlag Chermie, 1962, pp. 50–52).
[2] The K value is measured accoring to Fikentscher, "Cellulosechemie" 13, p. 58 (1932) in dimethylformamide (DMF). (See a.so Sorenson Campbell, Praparative Methoden der Polymeren-Chemie, pp. 37–40.)

NOTE:
g.=vitreous; lt=slightly cloudy; d=translucent; o=opaque.

TABLE 4

| | Starting components | | Reaction conditions | | | | | | | Properties of the reaction product | | |
|---|---|---|---|---|---|---|---|---|---|---|---|---|
| | A, parts | B, parts | $t_1$, min. | $T_1$, °C. | $b_1$, mm. | $n_2$, r.p.m. | $T_2$, °C. | $T_3$, °C. | Volatile components discharged at VA1 and VA2 | Polymer melting Point [1], °C. | Appearance |
| (a) | 90 | 10 | 16 | 205 | 5 | 100 | 240 | 210 | 11.8 | 145 | g. |
| (b) | 80 | 20 | 9 | 220 | 5 | 150 | 250 | 225 | 0.2 | 150 | lt. |
| (c) | 70 | 30 | 5 | 230 | 5 | 200 | 270 | 250 | 8.9 | 160 | lt. |
| (d) | 60 | 40 | 2 | 240 | 5 | 300 | 280 | 255 | 7.5 | 165 | lt. |
| (e) | 50 | 50 | 1.9 | 240 | 5 | 300 | 285 | 260 | 1.8 | 170 | lt. |
| (f) | 40 | 60 | 1.7 | 245 | 5 | 300 | 290 | 270 | 3.3 | 172 | d. |
| (g) | 30 | 70 | 1.5 | 245 | 5 | 300 | 300 | 270 | 8.1 | 175 | d. |
| (h) | 20 | 80 | 1.3 | 250 | 5 | 300 | 300 | 280 | 5.3 | 178 | o. |
| (i) | 10 | 90 | 0.8 | 270 | 5 | 300 | 310 | 285 | 6.6 | 185 | o. |
| (j) | 0 | 100 | 0.5 | 280 | 5 | 300 | 320 | 300 | 5.3 | 220 | w. |

[1] The polymer melting point is measured on the Kofler-Bank (Sorenson Campbell, Praparative Methoden der Polymeren-Chemie, Verlag Chemie, 1962, pp. 50-52).

NOTE: g=vitreous; lt=slightly cloudy; d=translucent; o=opaque; w=white.

TABLE 5

| | Starting components | | | Reaction conditions | | | | | | | | Properties of the reaction product | | |
|---|---|---|---|---|---|---|---|---|---|---|---|---|---|---|
| | Proportions | | Catalyst, C, parts | $t_1$, min. | $T_1$, °C. | $b_1$, mm. | $n_2$, r.p.m. | $T_2$, °C. | $b_2$, mm. | $T_3$, °C. | | Polymer Melting Point [1], °C. | K value [2] | Appearance |
| | A, parts | B, parts | | | | | | | | | | | | |
| (a) | 30 | 40 | 30 | 12 | 205 | 7 | 90 | 210 | 7 | 220 | | 145 | 78.3 | gt. |
| (b) | 20 | 40 | 40 | 17 | 190 | 7 | 50 | 200 | 7 | 210 | | 130 | 76.7 | wt. |
| (c) | 40 | 30 | 30 | 18 | 180 | 10 | 50 | 200 | 10 | 200 | | 135 | 82.2 | d. |
| (d) | 50 | 20 | 30 | 18 | 180 | 7 | 50 | 200 | 7 | 200 | | 140 | 74.7 | gt. |
| (e) | 20 | 60 | 20 | 18 | 180 | 7 | 50 | 200 | 7 | 200 | | 135 | 76.5 | gt. |
| (f) | 30 | 10 | 60 | 24 | 195 | 7 | 40 | 205 | 7 | 205 | | 160 | 78.4 | g. |
| (g) | 0 | 30 | 70 | 28 | 200 | 7 | 30 | 210 | 7 | 210 | | 165 | 79.5 | g. |

[1] The polymer melting point is measured on the Kofler-Bank (Sorenson Campbell, Praparative Methoden der Polymeren-Chemie, Verlag Chemie, 1962, pp. 50-52).
[2] The K value is measured according to Fikentscher, "Cellulosechemie," 13, p. 58 (1962) in dimethylformamide (DMF). (See also Sorenson Campbell, Praparative Methoden der Polymeren-Chemie, pp. 37-40.)

NOTE: gt=yellowish cloudy; wt= whitish cloudy; d=translucent; g=yellowish.

The embodiments of the invention in which an exclusive property or privilege is claimed are defined as follows:

1. A process for continuously polymerizing a mixture comprising a major portion of styrene and a minor portion of a comonomer selected from a group consisting of acrylonitrile, methylmethacrylate and acrylamide which process comprises the steps of:
   (a) introducing a suitable initiator to the mixture,
   (b) continuously kneading the mixture under a pressure of from 10 to 1,000 atmospheres and at a temperature of from 100 to 300° C. to produce a molten polymer,
   (c) subjecting the molten polymer from step (b) to shearing forces sufficient to bring its melt index between 0.1 and 50 measured at 10° to 20° C. above the melting point of the polymer and its K value measured in Fikentscher units between 30 and 100,
   (d) applying a subatmospheric pressure to the molten polymer for withdrawing volatile substances therefrom.

2. A process in accordance with claim 1 ond subjecting the molten polymer from step (b) to shearing forces sufficient to bring its melt index between 0.5 to 35 measured at 10° to 20° above the melting point of the polymer and its K value measured in Fikentscher units between 30 and 100.

3. A process in accordance with claim 2 wherein the comonomer is acrylonitrile.

4. A process in accordance with claim 2 wherein the comonomer is methylmethacrylate.

5. A process in accordance with claim 2 wherein the comonomer is acrylamide.

References Cited

UNITED STATES PATENTS

| 2,646,423 | 7/1953 | Wehr et al. |
| 2,941,985 | 6/1960 | Amos et al. |
| 2,745,824 | 5/1956 | Melchore. |
| 3,141,868 | 7/1964 | Fivel. |

HARRY WONG, JR., Primary Examiner

U.S. Cl. X.R.

23—290; 260—78.4, 78.5, 80, 80.3, 86.1, 86.3, 86.7, 88.1, 88.7, 89.5, 89.7, 91.5, 93.5